Figure 1:
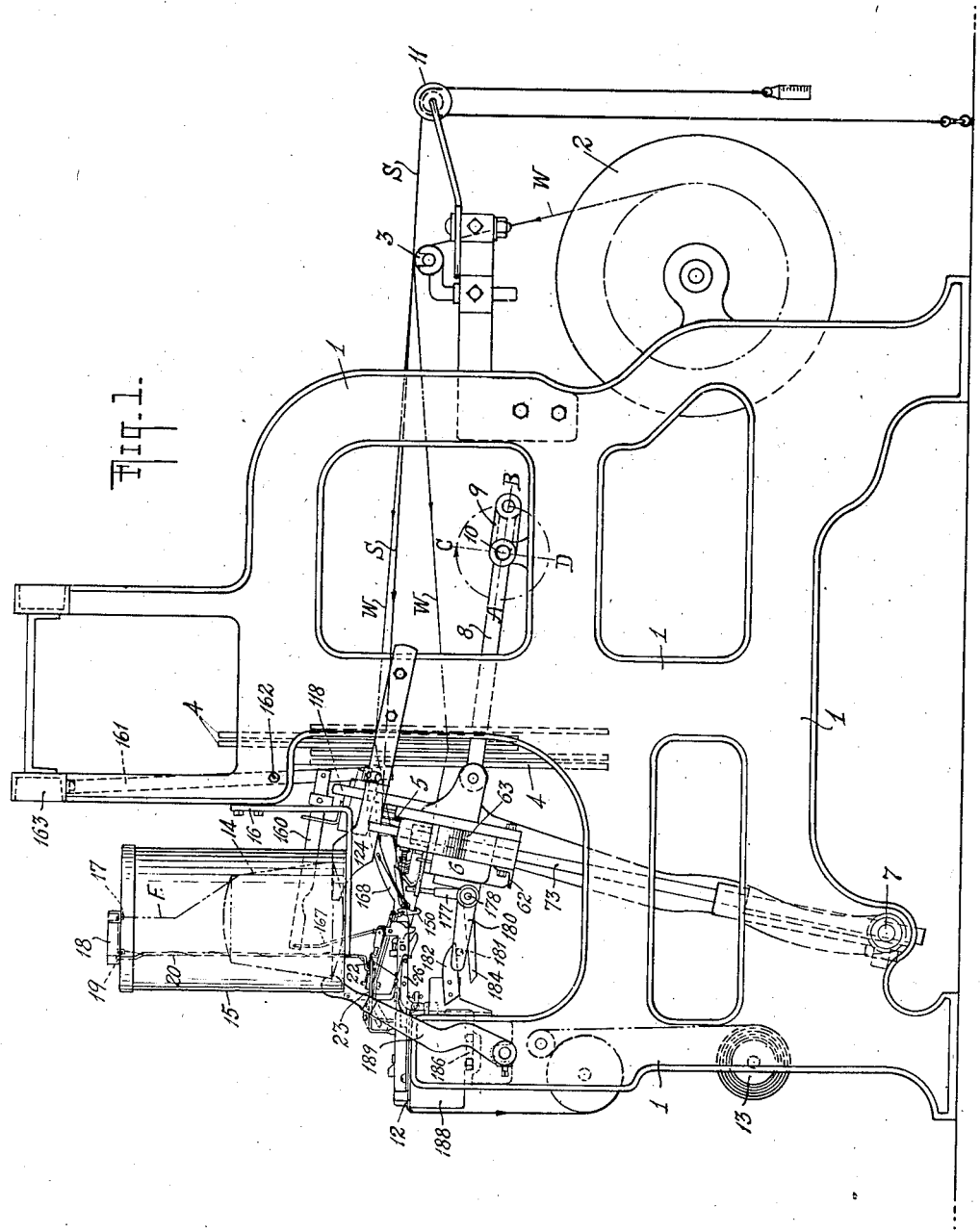

Dec. 9, 1941.  A. R. PEDRAZZO ET AL  2,265,190

LOOM

Filed Nov. 7, 1939  12 Sheets-Sheet 2

Fig. 2.

INVENTORS
ADONE R. PEDRAZZO
EMIL R. PEDRAZZO
BY
ATTORNEYS

WITNESS

Dec. 9, 1941.    A. R. PEDRAZZO ET AL    2,265,190
LOOM
Filed Nov. 7, 1939    12 Sheets-Sheet 3

Fig. 3

WITNESS
G. V. Rasmussen

INVENTORS
ADONE R. PEDRAZZO
EMIL R. PEDRAZZO
BY
Biesen & Shrenk,
ATTORNEYS

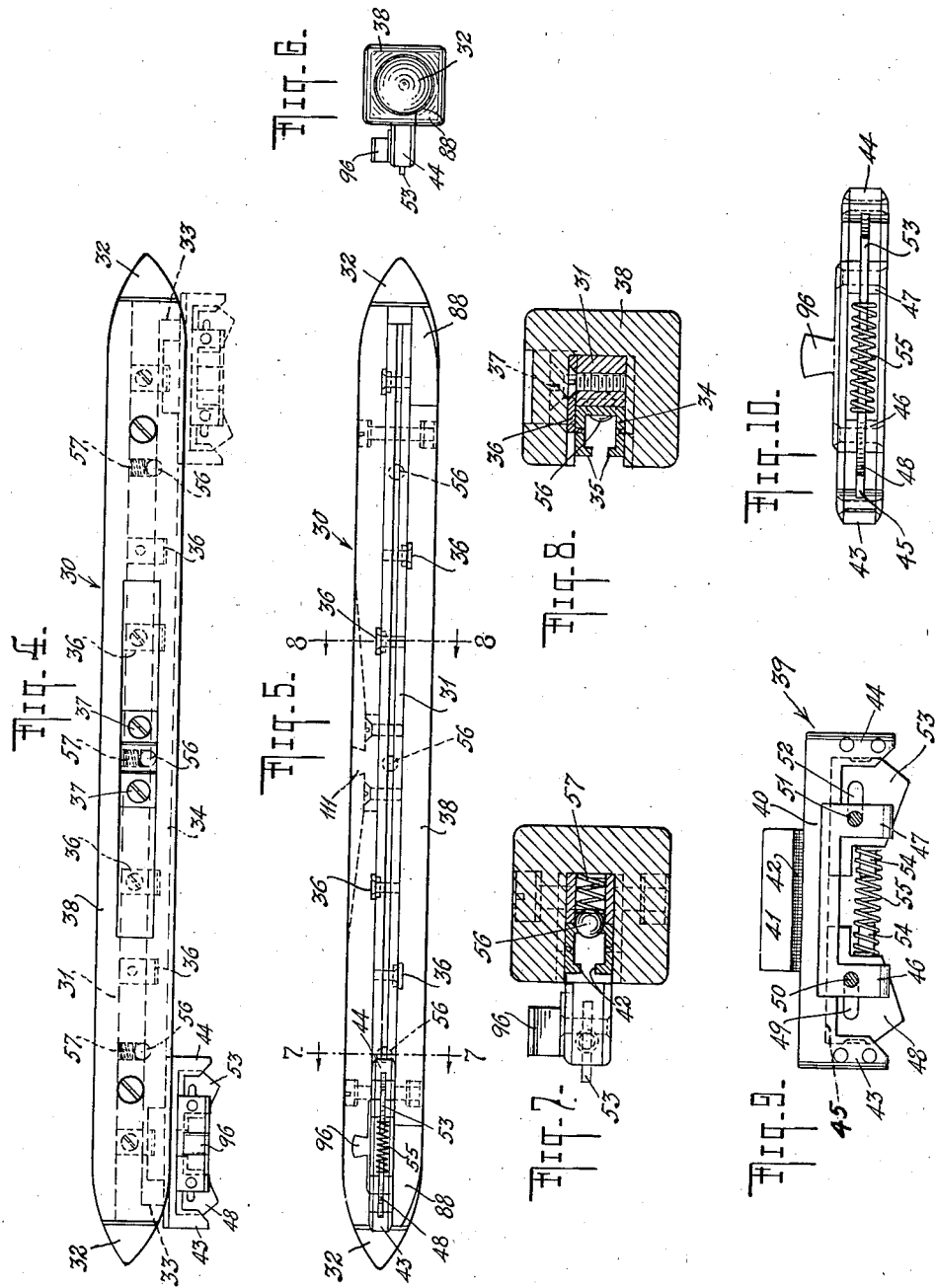

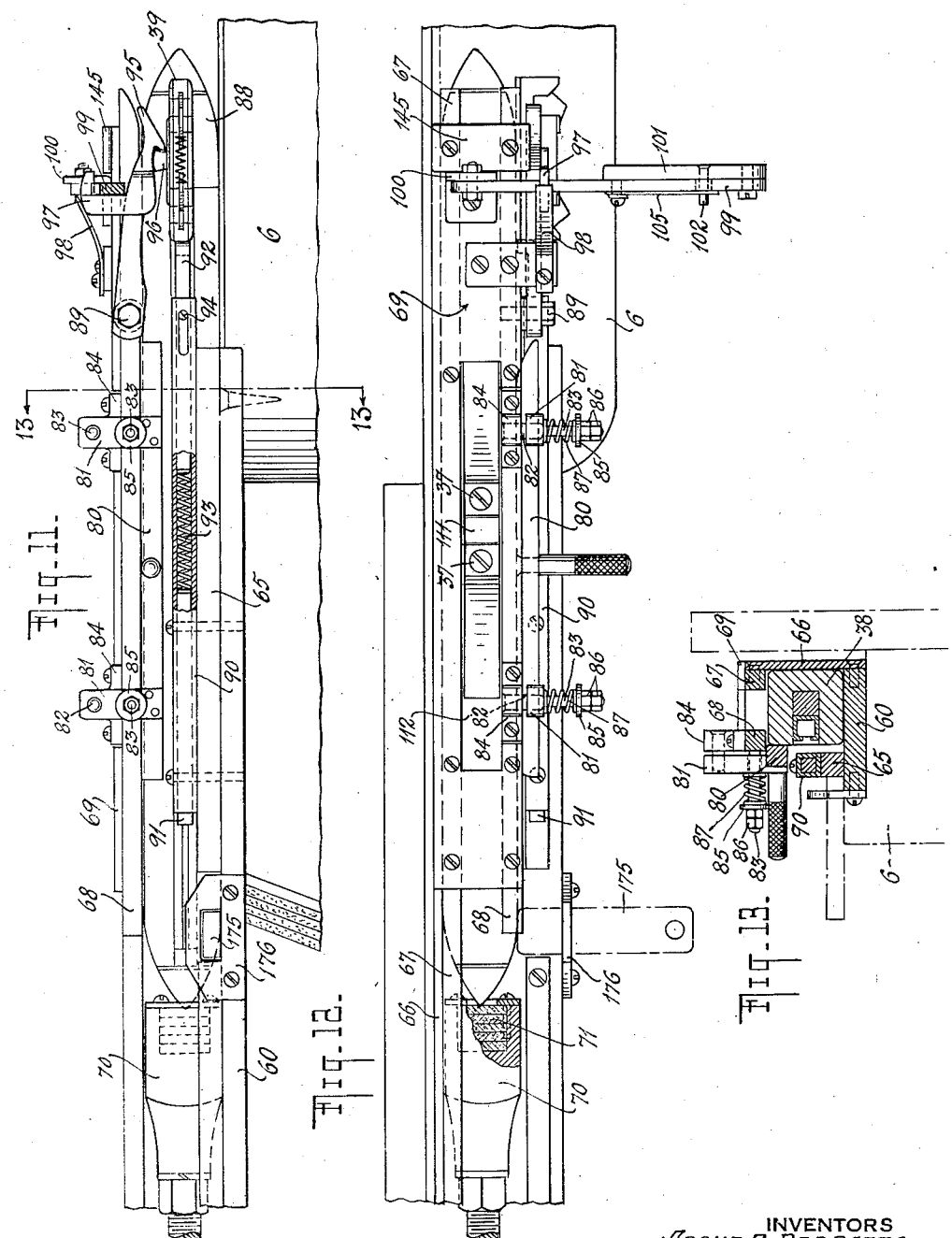

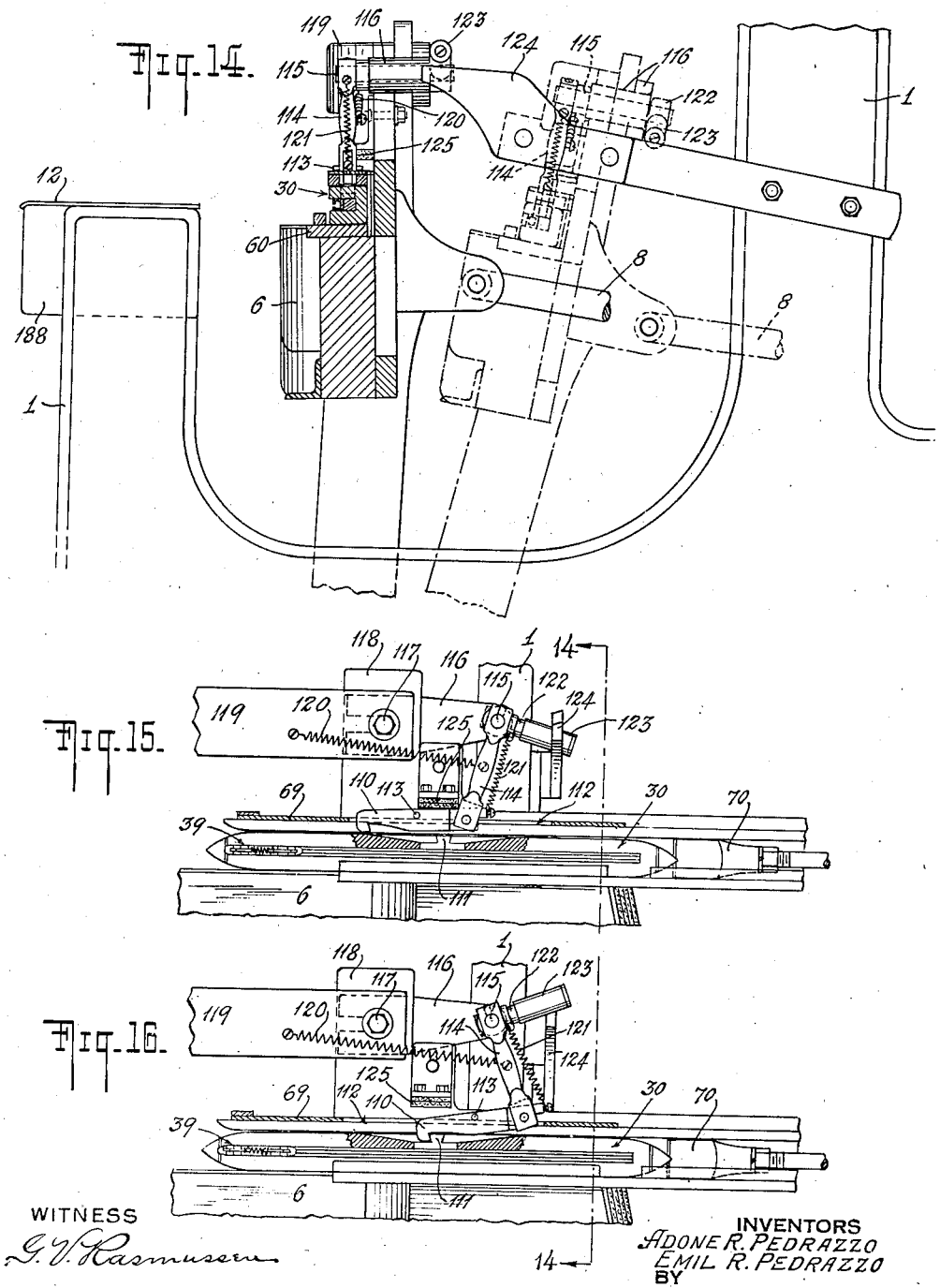

Dec. 9, 1941.   A. R. PEDRAZZO ET AL   2,265,190
LOOM
Filed Nov. 7, 1939   12 Sheets-Sheet 7
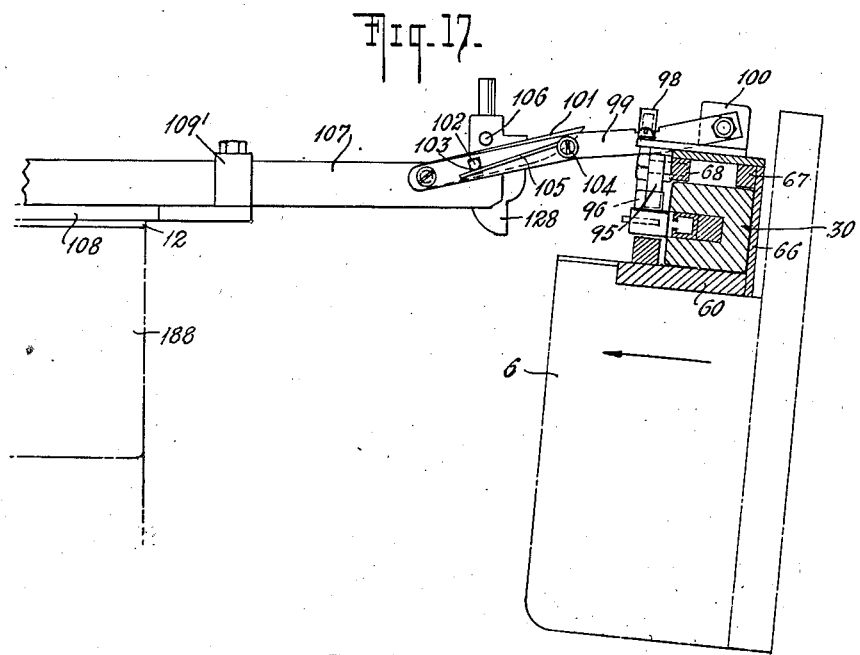
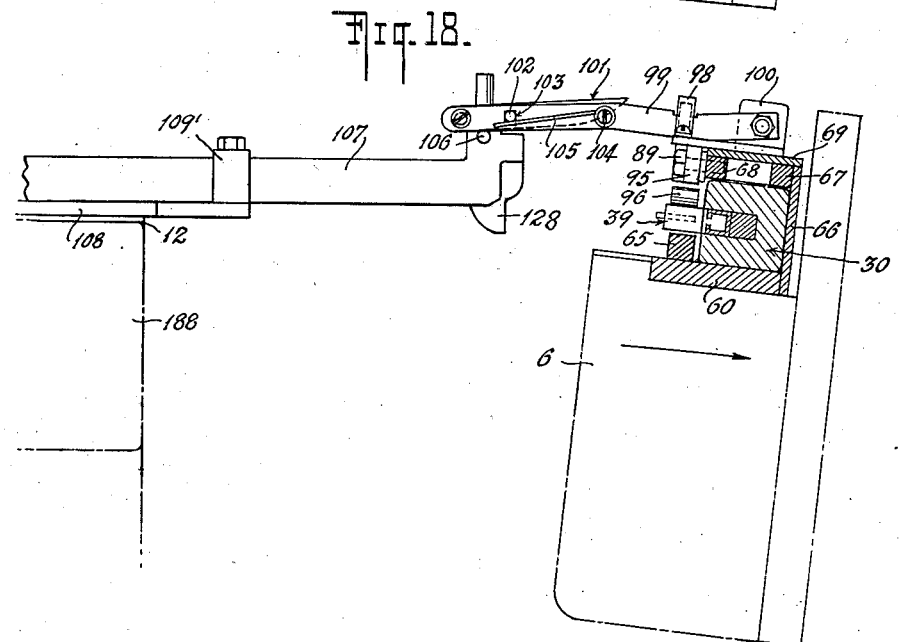
WITNESS
G. V. Rasmussen
INVENTORS
ADONE R. PEDRAZZO
EMIL R. PEDRAZZO
BY
Biesen & Shrenk,
ATTORNEYS Dec. 9, 1941.  A. R. PEDRAZZO ET AL  2,265,190
LOOM
Filed Nov. 7, 1939  12 Sheets-Sheet 8
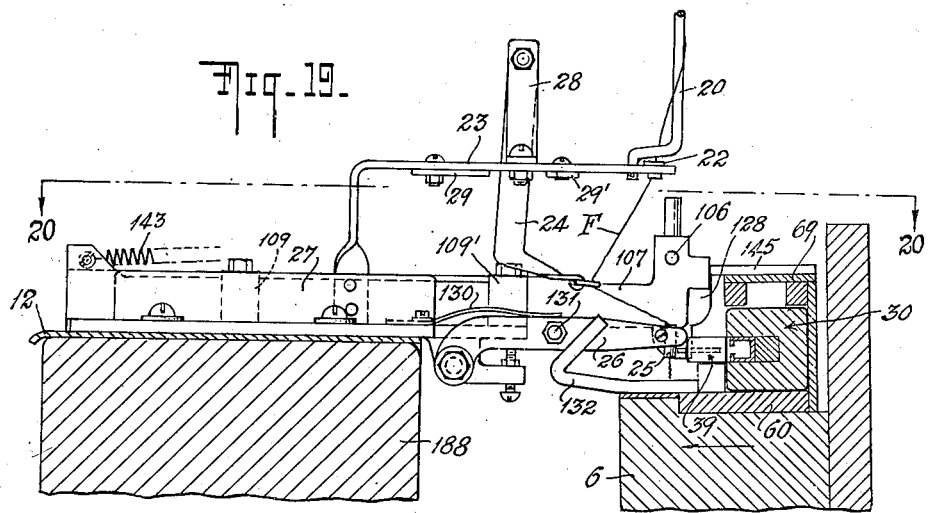
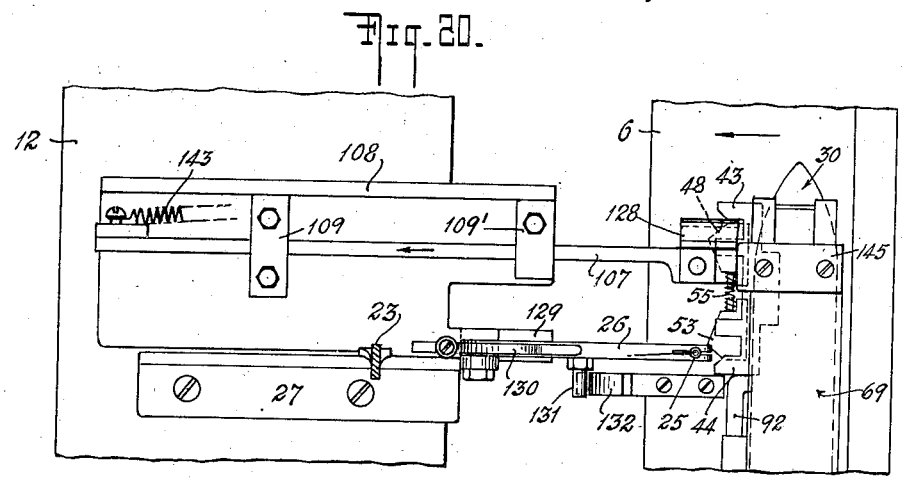
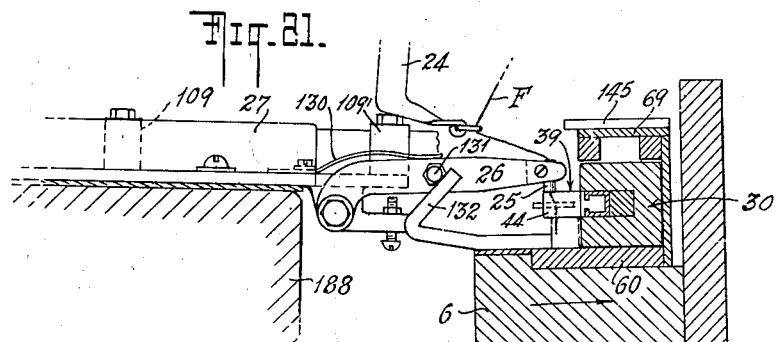
WITNESS
G. V. Rasmussen
INVENTORS
ADONE R. PEDRAZZO
EMIL R. PEDRAZZO
BY
Briesen Schrenk,
ATTORNEYS Dec. 9, 1941.   A. R. PEDRAZZO ET AL   2,265,190
LOOM
Filed Nov. 7, 1939   12 Sheets-Sheet 9
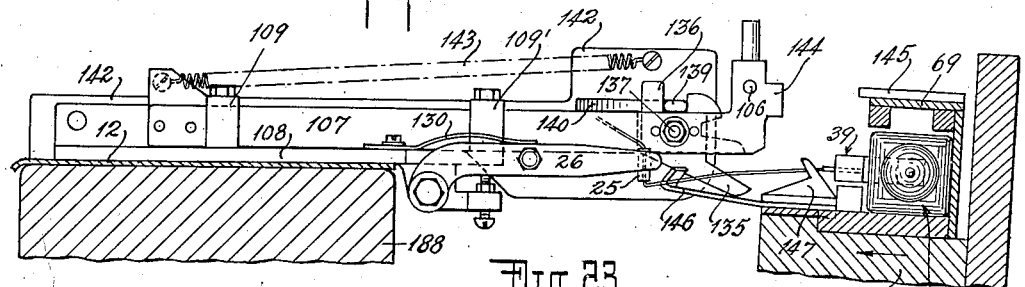
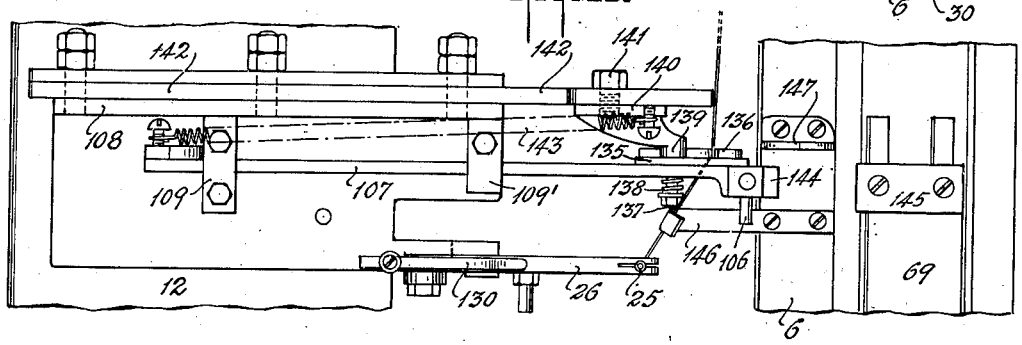
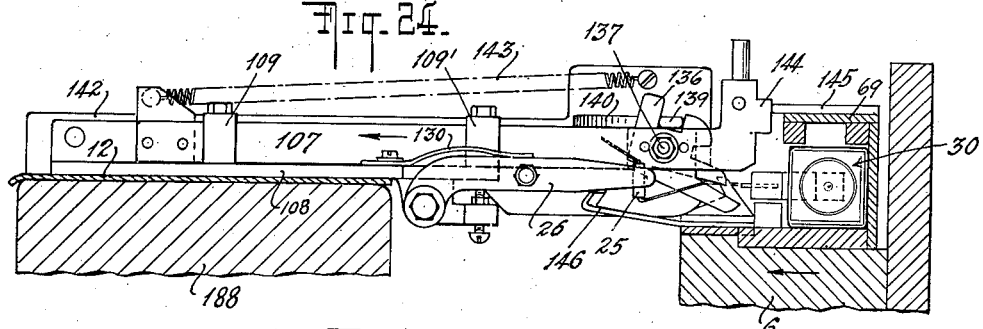
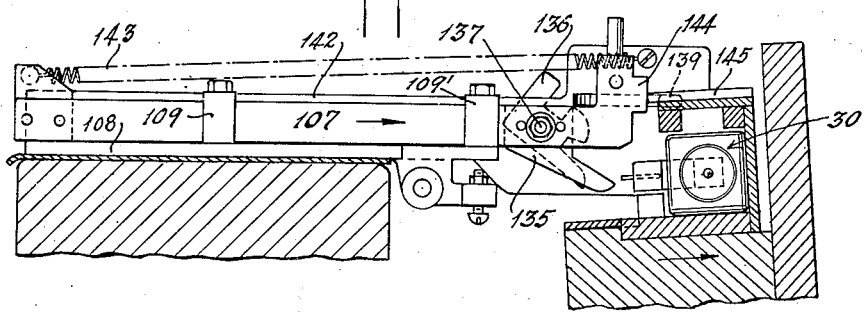
WITNESS
G. V. Rasmussen
INVENTORS
ADONE R. PEDRAZZO
EMIL R. PEDRAZZO
BY
Brieser Schrenk,
ATTORNEYS

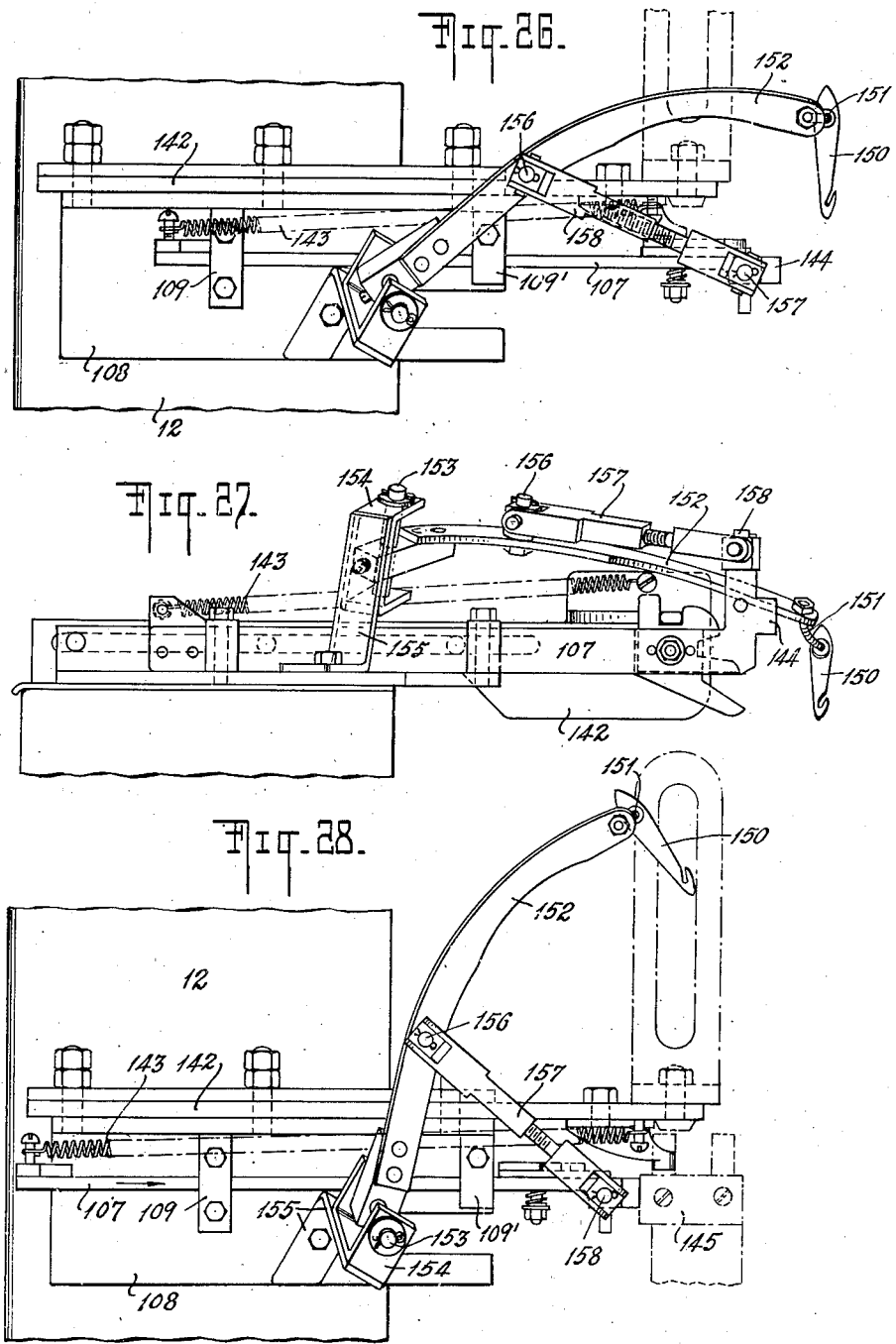

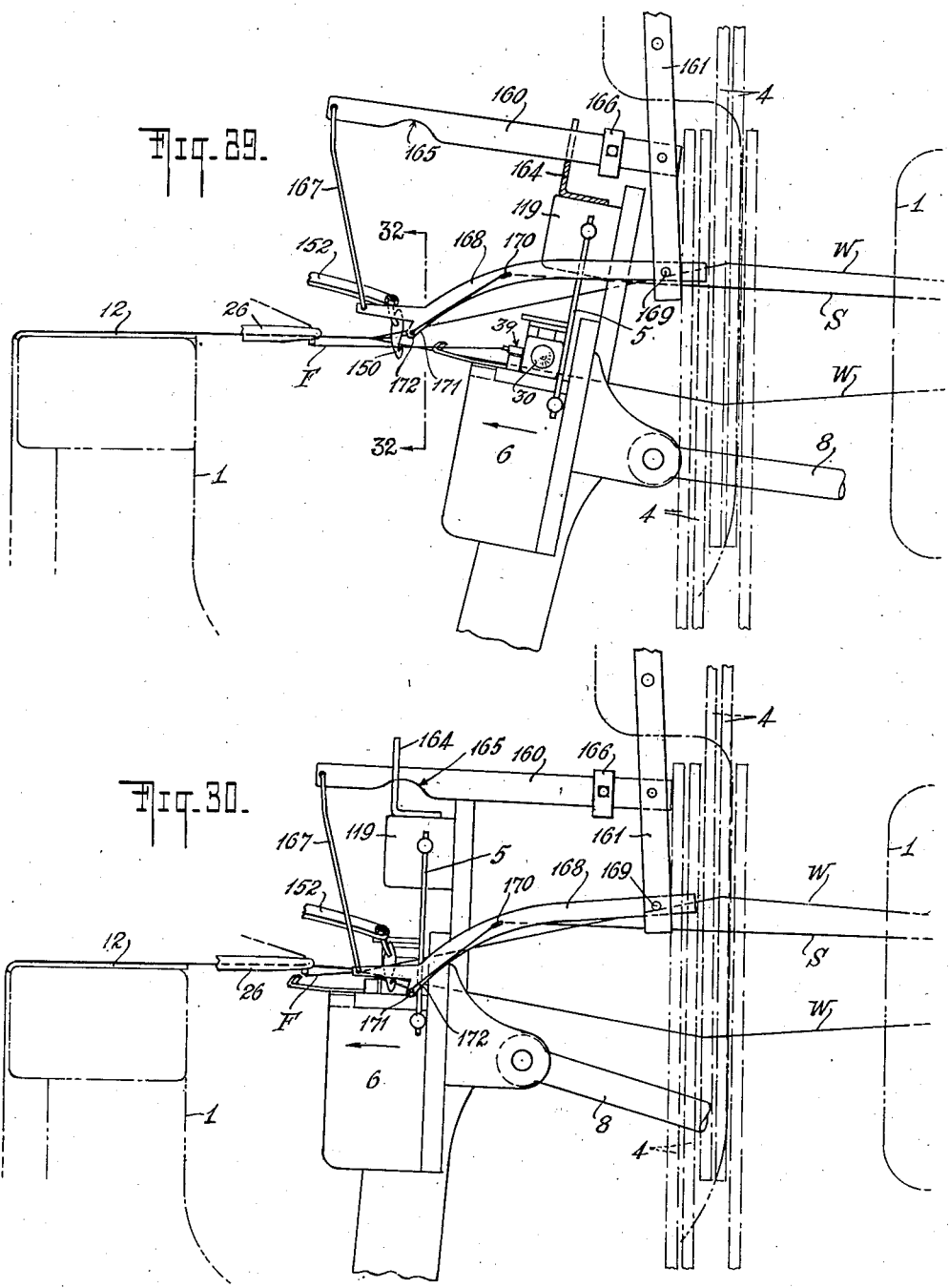

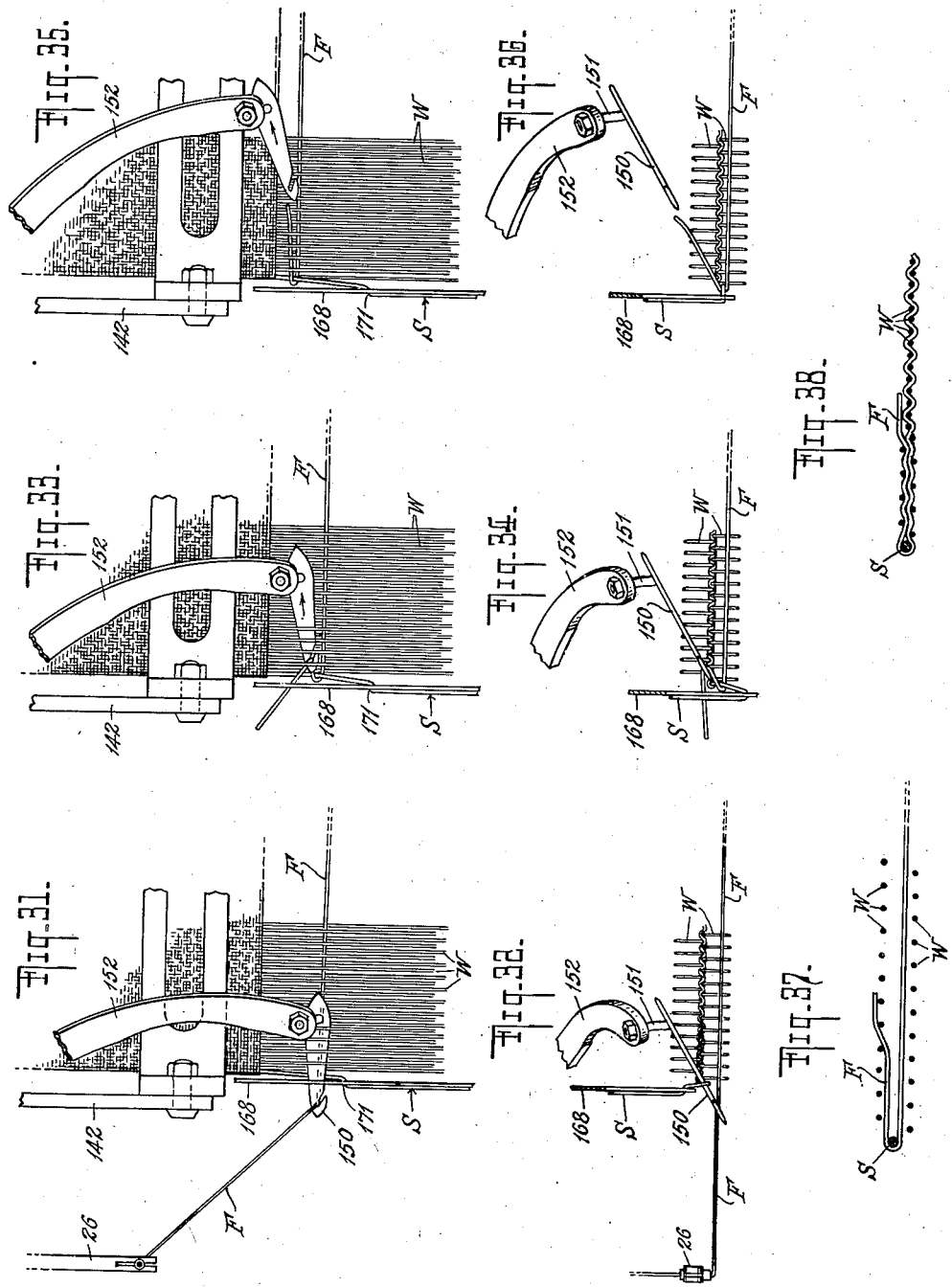

Patented Dec. 9, 1941

2,265,190

UNITED STATES PATENT OFFICE 2,265,190

LOOM

Adone R. Pedrazzo, Union City, and Emil R. Pedrazzo, West New York, N. J., assignors to Botany Worsted Mills, Passaic, N. J., a corporation of New Jersey Application November 7, 1939, Serial No. 303,178

21 Claims. (Cl. 139—126)

This invention relates to improvements in looms of the type in which the thread for the weft or filling is fed from cones or bobbins on each side of the loom to a shuttle which merely acts as a carrier to draw the filling threads through the shed.

The principal object of the invention is to provide an improved loom of the character indicated which will be simple and durable in construction and efficient and reliable in its operations.

In accordance with the above and other objects which will hereinafter become more apparent, an improved shuttle and shuttle actuating mechanism is provided which is of a simple and practical nature and designed to more efficiently carry out the functions of a loom of the character indicated.

Another feature of the invention is the provision of novel thread releasing and thread feeding means arranged and adapted to release the filling thread carried across by the shuttle and to feed a new filling thread to the shuttle at the same time and while the shuttle is at rest in a shuttle box.

A further feature of the invention is the provision of means for automatically positioning the shuttle and locking the same in correct position in the shuttle box to enable the thread releasing and feeding mechanisms to properly perform their functions.

A further feature of the invention is the provision of novel filler thread cutting means and selvaging mechanism arranged to be automatically controlled by mechanisms associated with the lay of the loom.

A still further feature of the invention is the provision of simple control means for timing the operations of the several mechanisms and for rendering the loom inoperative in the event that the shuttle does not come into correct registry for such operations.

Other features and advantages of the invention as well as the novel details of construction thereof will become more apparent after a perusal of the following description taken in connection with the accompanying drawings, in which Fig. 1 is a right-hand side elevation of the entire machine; Fig. 2 is a plan view on an enlarged scale of the right-hand front portion of the loom; Fig. 3 is a front elevation of the lay, taken on the line 3—3 of Fig. 2; Fig. 4 is a top plan view of the shuttle with the filler thread carriage in position to receive the thread at the right-hand end portion of the machine, the carriage being shown in dotted outline at the position it will be on the shuttle for receiving the filler thread at the left-hand side of the loom; Fig. 5 is a front elevation of the parts shown in Fig. 4; Fig. 6 is a right-hand end view of Fig. 5; Fig. 7 is an enlarged sectional view taken on the line 7—7 of Fig. 5; Fig. 8 is an enlarged sectional view taken on the line 8—8 of Fig. 5; Fig. 9 is an enlarged plan view of the filler thread carriage with the lug plate removed to illustrate the remaining parts more clearly; Fig. 10 is a front elevational view of the mechanism shown in Fig. 9; Fig. 11 is a front elevation illustrating the arrangement of the shuttle, shuttle box, brake shoe, bumper and latching mechanism when the shuttle is positioned in the shuttle box at the left-hand end of the loom; Fig. 12 is a plan view of the mechanisms shown in Fig. 11; Fig. 13 is a cross-sectional view taken along the line 13—13 of Fig. 11; Fig. 14 is an enlarged detailed side view, partly in section, along the lines 14—14 of Figs. 15 and 16, of the shuttle positioning pawl and the mechanism pertaining thereto, the full line drawing showing the relation of the parts at the extreme forward position of the lay and the dotted line drawing showing the relation of the parts in the retracted position of the lay; Fig. 15 is a front view, partly in section, of the shuttle and latch positioning means in unlatched position, as shown in dotted lines in Fig. 14; Fig. 16 is a similar view showing the latch mechanism in the locked positioning step as shown in the solid line figure in Fig. 14; Fig. 17 is a detailed cross-sectional view showing the positions of the locking and releasing latch mechanism in the forward motion of the lay with the shuttle locked in position; Fig. 18 is a similar view showing the return of the lay with the releasing mechanism in the act of releasing the shuttle latching mechanism; Fig. 19 is a cross-sectional view taken through the right-hand side of the lay and templet and illustrating the arrangement of the filler thread feeding and tensioning means, the filler thread needle, filler thread carriage and releasing mechanism; Fig. 20 is a plan view taken on the line 20—20 of Fig. 19, the pin 106 on the forward end of the arm 107 being omitted in this figure for the sake of clearness; Fig. 21 is a view similar to Fig. 19 showing the maximum or extreme forward motion of the lay, in position to return, with the needle raised out of engagement with the filler thread carriage, the end of the thread carried thereby being gripped by the latch members of the carriage; Fig. 22 is a detailed sectional elevation of the filler thread needle and cutter mechanism; Fig. 23 is a top plan view of the mechanism shown in Fig. 22; Fig. 24 is a detailed similar view, similar to Fig. 22, showing the relation of the parts when the movable cutter is in position to cut the filler thread; Fig. 25 is a similar view showing the movable cutter in its fully operated position, the filler thread being already cut and the lay starting its return stroke; Fig. 26 is a detailed plan view of the filler selvage hook mechanism in its normal position; Fig. 27 is a side view of the mechanism illustrated in Fig. 26; Fig. 28 is a detailed plan view, similar to Fig. 26, but showing the filler selvage hook at the end of its movement under the action of the lay; Fig. 29 is a diagrammatic side view illustrating the positions of the selvaging control mechanism at the start of the forward movement of the lay; Fig. 30 is a similar view illustrating the positions of the selvaging control mechanism at the half of the forward movement of the lay with the selvage thread brought into lower position, in position for the ends of the filler or weft thread to be interwoven through the shed and around the selvage thread; Fig. 31 is a detailed top plan view of the right-hand end of the warp showing the selvage control arm in the position illustrated in Fig. 29 with the selvage forming hook thereof disposed between the upper and lower separated warp threads and in engagement with the filling thread; Fig. 32 is a view of the parts shown in Fig. 31 taken from the rear of the shed along the line 32—32 of Fig. 29; Fig. 33 is a view similar to Fig. 31 illustrating the action of the selvage forming hook as it is being withdrawn through the upper warp threads of the shed; Fig. 34 is a view similar to Fig. 32 illustrating the position of the parts shown in Fig. 33; Fig. 35 is a view similar to Figs. 31 and 33 and shows the selvage forming hook after it has completed its movement through the upper warp threads of the shed; Fig. 36 is a view similar to Figs. 32 and 34 illustrating in another view the positions of the parts shown in Fig. 35; Fig. 37 is an enlarged detailed section showing the end of the filling thread in its fully drawn condition with the upper and lower warp threads separated and Fig. 38 is a sectional view of a portion of the completely woven cloth illustrating the manner in which the selvage end of the filling thread is locked in position.

In order that the construction and operation of the mechanisms illustrated in the accompanying drawings may be more readily understood, it should be kept in mind that the shuttle used in this loom is of the pirnless type in that it carries no thread supplying quills or cops. The shuttle merely acts as a carrier for the weft or filling thread which is fed to the shuttle at one end of the loom and is detached therefrom when the shuttle reaches the other end of the loom at the end of its throw. Associated with the shuttle boxes at each end of the loom are mechanisms for bringing the shuttle into proper position to be loaded, for locking the shuttle in loading position, for feeding and discharging ends of filling threads from the shuttle, for cutting filling threads to their proper lengths and forming the ends thereof into a selvage, for releasing the various latching and locking mechanisms and for actuating the shuttle. The corresponding mechanisms on each side of the loom are similar in all respects except for certain details which will be pointed out. In view of the similarity of the mechanisms on each side of the loom and the fact that a description of those on one side of the loom will suffice for an understanding of the operation of those on both sides, a detailed description of the mechanisms at the right-hand side of the loom only will be given, it being understood that such description applies in all respects to the mechanisms at the other side of the loom.

Turning now to the drawings, it may be first pointed out generally that the body of the loom is of usual construction and includes side frame members 1 which are connected by cross members in the customary fashion. The warp threads W are fed from a spool 2 at the rear of the loom forwardly over a roller 3 and then through heddle frames 4 and a reed 5 of any desired construction. The heddles 4 may be arranged in any manner to open the warp and form the shed in the usual way and the reed 5 is oscillated in the usual manner to pack the filling thread F after the latter has been fed through the shed. The oscillatory movement of the reed 5 is about the pivotal axis of the lay 6 on the upper end of the latter of which the reed is mounted, the lower end of the lay 6 being connected in the usual manner to a transverse shaft 7 which is supported at its ends by the side frame members 1 of the loom. As is usual, the lay 6 is pivoted about the shaft 7 as an axis by means of a crank arm 8 which is pivotally connected at one end to the rear of the lay and at its other end is connected to a crank 9 fixedly attached to a crank shaft 10 extending transversely of the loom. The crank shaft 10 and crank 9 are rotated in a clockwise direction, as viewed in Fig. 1 of the drawings, and when the crank 9 is in the position designated A, the lay has been advanced to its forward or closed position while, when the crank 9 is at the position designated B, in the position shown in Fig. 1, the lay has been withdrawn to its rearmost or fully retracted position. Disposed on each side of the series of warp threads W is a selvage thread S which is fed from a tensioned spool 11 at the rear of the loom forwardly over the roller 3 through the heddle frames 4 and reed 5 and through a pair of eyes provided on a forwardly extending guide arm, as will be hereinafter more fully explained. The woven material formed from the warp threads W, selvage threads S and filling threads F feeds forwardly over the templet 12 provided on a cross beam of the loom, then passes downwardly from such templet and is wound up on a roller 13 supported by the side frame members 1 at the front of the loom. As the parts so far described form no part of the present invention, details thereof have not been illustrated.

*Filling thread feeding means*

On each side of the loom beyond the series of warp threads is provided a suitable spool or cone 14 on which is wound the filling or weft thread F (see Figs. 1 to 3). Each of the cones 14 is disposed in a suitable container 15 which is preferably made of transparent material and is mounted on a bracket 16 fixedly attached to the adjacent side frame member 1 of the loom. As is shown more clearly in Figs. 1 and 2, the filling thread F from each spool 14 is drawn upwardly through an eye 17 provided at one end of a channel-shaped guide member 18 which is secured at such end to the cover of the container 15 and projects transversely and forwardly of the loom into association with the operating mechanisms at such end of the loom. The filling thread F passes from the eye 17 through the channel of the guide member 18 to an eye 19 provided at the other or outer end of such guide member and then downwardly from such eye 19 around a rod 20 which is attached at its upper end to the outer end of the channel member 18. During the passage of the filling thread F through the channel member 18 it is maintained in frictional engagement with the bottom wall of such member, which is preferably lined with felt, by a plurality of tension members 21, 21 (see Fig. 2) which function to yieldably retard the feed of the filling thread from the spool 14 to the rod 20. The filling thread F is fed down the vertically disposed rod 20 in a spiral manner (see Fig. 1) and at the lower end of such rod is passed through an eye 22 provided on the outer end of a bracket arm 23 to which is also connected the lower end of the rod 20. From the eye 22 the filling thread passes through a ring or eye provided on the lower offset end of a member 24 and thence through an eye 25 provided on the outer or free end of a needle 26. As is shown more clearly in Figs. 19 and 20 of the drawings, the bracket arm 23 is fixedly secured at its forward end to a bracket plate 27 mounted on the templet 12. Secured to the bracket arm 23 intermediate its ends is a vertically disposed bearing plate 28 to the upper end of which is pivotally connected the member 24 which depends therefrom. The member 24 functions in the nature of a pendulum, being normally in the position shown in Fig. 19, but swinging towards the right as viewed in such figure, when tension is exerted on the filling thread. The oscillating movement of the member 24 is limited by the adjustable stop members 29, 29' provided on the bracket arm 23. It will thus be seen that the filling thread F during its feed from the spool or cone 14 is restricted against free movement by its engagement with the felt lining in the channel member 18 under the influence of the tension members 21, 21, the frictional engagement of such thread with the exterior surfaces of the rod 20 around which it is spirally fed, and the inertia of the pendulum member 24. Although exerting a restraining influence on the feed of the filling thread, the pendulum member 24 by reason of its being pivoted can immediately supply a sufficient amount of the filling thread to take up the initial shock imparted thereto when the shuttle is thrown across the loom, thereby preventing breakage of the filling thread during this operation. When the filling thread is cut at the end of the throw of the shuttle, as will hereinafter be more fully explained, the weight of the pendulum member 24 enables it to return to its normal position thereby retracting the cut end of the thread so that only a small portion of it dangles from the eye 25 of the needle 26, as is shown in Fig. 19.

*Shuttle or filling thread carrier*

The shuttle or carrier to which the filling thread F is fed by the needle 26 is illustrated in greater detail in Figs. 4 to 10 of the drawings. Referring now to such figures, it will be seen that the shuttle which is designated generally by the numeral 30, comprises a longitudinally extending core or frame member 31 made of metal and terminating at its ends in conically shaped members 32 which form the ends of the shuttle. The frame member 31 is provided adjacent to the conical ends 32 with a pair of forwardly projecting portions 33 intermediate which is positioned a channel member 34 having inwardly directed opposed lips or flanges 35 (see Figs. 7 and 8). The channel member 34 is secured to the frame member 31 by a plurality of spaced fastening plates 36 which are attached to the frame member 31 in any suitable manner, as by bolts 37. Enclosing the frame member 31 and the channel member 34 is a U-shaped wooden frame 38 which forms the body of the shuttle 30.

Slidingly carried by the channel member 34 of the shuttle is a filling thread carriage which is designated generally by the reference character 39. As is shown more clearly in Figs. 7, 9 and 10 of the drawings, the carriage 39 includes a body portion 40 having integrally formed therewith a rearwardly extending lug or guide member 41 which is positioned in the channel of the channel member 34 and is of a shape conforming with the shape of such channel. Intermediate the guide lug 41 and the body 40 of the carriage are provided a pair of upper and lower longitudinally extending recesses or grooves 42 within which seat the opposed flanges or lips 35 of the channel member 34, as is shown more clearly in Fig. 7 of the drawings. The portion of the body 40 forming the outer walls of the grooves 42 is disposed intermediate the interior surfaces of the outer edge portions of the U-shaped body 38 of the shuttle and cooperates with such surface portions to assist in maintaining the carriage in a horizontal position during its sliding movements in the channel member 34. The body of the carriage is provided with a pair of forwardly projecting end members 43 and 44, the forward face of the body 40 and the opposed faces of the end members 43 and 44 being recessed to provide a U-shaped groove 45, as is indicated in dotted lines in Fig. 9 of the drawings. Intermediate the end members 43 and 44, the body 40 is provided with a pair of spaced forwardly projecting slotted extensions 46 and 47, the slots of which are in alignment with the U-shaped groove 45. Positioned in the slot of the extension 46 and slidably mounted in that end portion of the groove 45 formed in the body 40 and end member 43 is a slide plate or latch member 48 provided with an elongated aperture 49 through which extends a guide pin 50, the latter of which is secured to the slotted extension 46. A similar pin 51 is connected to the slotted extension 47 and like the pin 50 extends through an elongated guide aperture 52 provided in a plate or latching member 53 positioned in the slot of the extensions 47 and mounted for slidable movement in the portion of the U-shaped groove 45 at the other end of the carriage. The slidable plates or latch members 48 and 53 are provided on their opposed edges with spring rests 54 which support the ends of a spring 55 positioned intermediate said plates and adapted to maintain the latter in their fully advanced positions, the positions illustrated in Fig. 9 of the drawings. It will be seen from the foregoing description that the carriage 39 on the shuttle 30 is adapted for slidable movement on the channel member 34 lengthwise of the shuttle. This sliding action of the carriage takes place during the throw of the shuttle while when the shuttle is at rest in a shuttle box the carriage is at either end of the shuttle. Assuming, for instance that the shuttle is positioned in the right-hand box of the loom, then the carriage is on the left-hand side of the shuttle, as is shown in full lines in Fig. 4 of the drawings. When the picker at the right-hand side of the loom is actuated to impart to the shuttle a blow sufficient to drive it across the lay 6 of the loom, the carriage 39 by reason of its inertia and its slidable connection with the shuttle does not instantly partake of the sudden movement of the latter to the left but moves relative to the shuttle to the dotted line position shown in Fig. 4 of the drawings, in which position it is held during the passage of the shuttle across the loom. By this method the carriage 39 is brought to a trailing position at the back of the shuttle 30, leaving the pointed end of the latter free as in ordinary shuttles. In order to prevent a too rapid or free movement of the carriage 39 with relation to the shuttle 30 there are provided in the back of the channel member 34 a plurality of longitudinally spaced apertures through which project friction balls 56 which are maintained in position by springs 57 contained in suitable recesses provided in the frame member 31. It will thus be seen that as the carriage 39 is moved from one end of the shuttle 30 to the other, the portion 41 thereof comes into successive engagement with the spring-pressed friction balls 56 which appreciably retard its movement, but do not operate to block or stop such carriage in its movement throughout the length of the shuttle. The movement of the carriage 39 relative to the shuttle 30 will always be in the direction from which the shuttle is thrown. Associated with both shuttle boxes are means for inserting the end of a filler thread between one of the latch members of the carriage and its associated end member. When the shuttle is coming from the left-hand shuttle box into the right-hand shuttle box with the carriage in the position illustrated in full lines in Fig. 4 of the drawings, the filling thread carried by the carriage is secured thereto between the latch member 48 and the end member 43. When the shuttle 30 is properly positioned in the right-hand shuttle box, means are provided to release the end of the filling thread held between the latch member 48 and end member 43 and at the same time to secure the loose end of a filling thread from the spool or cone 12 disposed on the right-hand side of the loom between the slidable plate or latch member 53 and the end member 44, as will hereinafter be more fully explained. Thus the latch member 53 and end member 44 will carry the end of the filling thread across the loom as the shuttle is thrown to the left, as has been above explained. When the shuttle reaches the shuttle box at the left-hand side of the loom, means similar to the mechanism on the other side of the loom come into operation to release the end of the filling thread from the clamping action of the members 53 and 44 and at the same time insert the loose end of a filling thread fed from the spool or cone 12 at the left hand side of the loom to the members 43 and 48.

Shuttle control means

The shuttle box at each side of the loom comprises a bottom plate 60 which is supported at one end on the adjacent end of the lay 6 and at its other end by a bracket member 64 carried by a bracket arm 63, the latter of which is mounted on the outer end of an angle beam 62 secured at its other end to the lay 6, as is shown more clearly in Fig. 3 of the drawings. Secured to the forward edge portion of the bottom plate 60 is a guide member 65 which extends longitudinally of the bottom plate from the lay 6 to the bracket member 64. The rear of the box is formed by a back plate 66 which is secured at its lower edge to the bottom plate 60 and has attached to its upper edge a top guide member 67 as is shown in Figs. 13, 17 and 18 of the drawings. Overlying the guide member 67 and the top edge of the back plate 66 and being secured thereto is a top plate 69 which has attached to its forward edge a guide member 68 disposed in parallel relation to the guide members 65 and 67. In the outer projecting portion of the shuttle box is positioned a picker 70 which may be made of a plurality of metal parts, as is illustrated in Fig. 3 of the drawings, or made in one piece of a light metal such as cast aluminum, copper alloy. The forward end of the picker 70 is provided with a recess within which are positioned a plurality of leather blanks or discs 71, the latter of which are secured in position in the recess by a plate 72 which is provided with a central aperture to enable the end of the shuttle to engage with the outermost leather blank or disc 71. The other or opposite end of the picker 70 is provided with an aperture through which extends the upper end of the picker stick 73. The picker sticks 73 are connected to the loom and operate in a conventional manner to cast the shuttle back and forth across the lay 6. Extending through the head of each bracket arm 63 is a bolt 74 which is provided at its forward end with a number of leather blanks or discs 75 which cushion the picker 70 at the end of the return movement of the picker stick 73.

At the end of the shuttle box which is adjacent to the lay 6 there is provided a brake shoe 80 which extends longitudinally of the box and is positioned adjacently under the top guide member 68. As is shown more clearly in Figs. 11 to 13 of the drawings, the brake shoe 80 is supported by a pair of spaced depending arms 81, each of which is slidably mounted on a pair of pins 82 and 83 fixedly secured to a bracket 84 mounted on the front guide member 68 of the shuttle box. The pin 83 is provided intermediate the arm 81 and a washer 85 mounted thereon, with a spring 87 which normally maintains the arm 81 and consequently the shoe 80 in position to brake the movements of the shuttle. The washer 85 is secured on the pin 83 by means of the lock nuts 86 which threadedly engage the outer end of such pin.

Mounted on the guide member 65 below the brake shoe 80, is an elongated casing 90 within which is positioned at the end thereof adjacent to the picker 70, a rod 91 which is secured in position in the casing. Spaced from the rod 91 and extending outwardly from the other end of the casing 90 is a plunger 92. Intermediate the rod 91 and the plunger 92 is a spring 93 which normally maintains the plunger 92 in its outermost position, as is shown in Fig. 11 of the drawings. The plunger 92 may be provided with a pin 94 which extends through an elongated guide slot provided in the casing 90 and cooperates with the same to restrict the outward movement of the plunger 92 under the pressure of spring 93 and the movement of the plunger into the casing 90. The plunger 92 is so arranged that when the shuttle enters the box the leading end of the carriage 39 comes into engagement therewith and if the carriage has not already moved to its outermost position at the trailing end of the shuttle, the plunger 92 will function to force the carriage to such outermost position. When the shuttle is in its final resting place within the shuttle box, the plunger 92 also cooperates with a hook 95 to properly position the carriage with respect to the filling thread needle and the filling thread releasing means associated with the shuttle box and to lock the carriage in position to enable such means to perform their functions, as will hereinafter be explained.

Carriage positioning means

The carriage positioning hook 95 is pivotally mounted on a bolt 89 secured to the upper guide member 68 and is arranged to engage at its free end with a lug 96 provided on the carriage 39 of the shuttle 30, as is shown more clearly in Figs. 11 and 12. Intermediate its ends, the hook 95 is provided with an upwardly extending control member 97 whose upper end is offset to overlie an arm 99 extending transversely thereto. Mounted on the top plate 69 of the shuttle box in any suitable fashion is a leaf spring 98 whose free end bears on the offset upper end of the control member 97. The spring 98 through its downward pressure on the control member 97 maintains the latter in contact with the upper surface of the arm 99 and the hook 95 in its lowermost position, in the path of movement of the lug 96 on the filling thread carriage 39, such spring functioning to return the hook immediately after it has been cammed upwardly by the action of the lug 96 on the forward inclined edge of the hook 95 as the shuttle moves into the shuttle box to cause such hook to come into latching engagement with the lug 96. It will thus be seen that in its latched condition the carriage 39 will be positioned between the spring-pressed plunger 92 and the hook 95 through its engagement with the lug 96 and will be secured in such position against any movement lengthwise of the shuttle. The arm 99 which is in engagement with the control member 97, is pivoted at its rear end on a bracket 100 mounted on the top plate 69 of the shuttle box, as is shown more clearly in Figs. 17 and 18 of the drawings. When the hook 95 is in its normal or lowermost position, the arm 99 is resting on the forward edge of the top plate 69, as is shown in Fig. 17. Means are provided on the outer end of the arm 99 to lift the latter about its pivot on the bracket 100, thereby lifting the control member 97 of the hook 95 and consequently lifting the hook to release its engagement with the lug 96 on the filling thread carriage 39. These means comprise a cam member or catch hook 101 which is positioned adjacent to and alongside the forward end of the releasing arm 99 and is pivotally connected to such arm at its extreme forward end. The cam member 101 is provided intermediate its ends with a pin 102 which extends through an aperture 103 provided in the releasing arm 99, and of such a size as to permit a limited movement of the member 101 about its pivot. Secured to the releasing arm 99 intermediate its ends, as by means of a threaded bolt 104, is a spring 105 whose free end bears against the under side of the pin 102 and normally maintains the latter in engagement with the upper end of the aperture 103. In the normal position of the arm 99, the outer end portion thereof and the cam member 101 connected thereto pass below a transverse pin 106 provided on a rearwardly extending arm 107 during the forward motion of the lay, as is illustrated in Fig. 17. The arm 107 is slidably supported by guides 109, 109' provided on a bracket plate 108 secured to the templet 12 and the underlying cross-beam of the loom. During the forward motion of the lay, the upper surface of the cam member 101 comes into engagement with the pin 106 and the latter depresses such member against the tension of the spring 105. As soon as the lay has moved forwardly sufficiently so that the cam member 101 clears the pin 106, the spring 105 functions to return the cam member 101 to its normal position with the pin 102 against the upper surface of the aperture 103. The rear end of cam member 101 in this position is raised sufficiently to enable it to catch and to ride up on the pin 106 on the rearward movement of the lay and consequently to raise the arm 109 about its pivot on the bracket 100, thereby breaking the engagement of the hook 95 with the lug 96 on the carriage 39 and releasing such carriage from its locked position. The several parts described are so arranged that the releasing action of the hook 95 takes place just before the lay reaches the half way point of its rearward movement so that when the picker 70 is actuated at such point to throw the shuttle 30 across the loom, the carriage 39 is released to partake in the movement of the shuttle. During the period when the catch hook or member 101 passes underneath the pin 106 on the forward movement of the lay and rides up on such pin on the return movement of the lay, the slidable arm 107 is pushed forwardly to actuate cutting and selvaging forming mechanisms, as will be hereinafter more fully explained.

Shuttle positioning means

Should the momentum of the shuttle as it arrives in its shuttle box be insufficient to enable it to advance into the shuttle box to permit latching of the hook 95 with the lug 96 on the filler thread carriage 39 as above explained, means are provided to draw the shuttle 30 into proper position in the shuttle box for such operation. These means include a hook 110 which is adapted to engage a lug 111 provided on the top surface of the shuttle, as is shown more clearly in Figs. 14, 15 and 16. The hook 110 is positioned in a longitudinally extending aperture 112 provided in the top plate 69 of the loom box and is provided intermediate its edges with a transverse pin 113 whose outer projecting ends ride on the side edges of the aperture 112. The inner end of the hook 110 is pivotally connected to the lower end of an actuating arm 114 whose upper end is fixedly attached to a pin 115 rotatably supported on the outer end of a bearing bracket 116, the latter of which is attached at its other end by means of a bolt 117 to the upper end of the frame member 118. The bolt 117 also secures one end of a cross member 119 to the frame member 118. Attached to the cross member 119 is one end of a spring 120 whose other end is attached to the actuating arm 114, intermediate the ends of the latter. A spring 121 is also attached at one end to the heel or pivoted end of the hook 110 and at its other end to the pin 115. It will thus be seen that the hook 110 and the actuating arm 114 are normally maintained in their retracted positions by means of the spring 120, while the spring 121 normally maintains the pin 113 in engagement with the side edge portions of the aperture 112 formed in the top plate 69 of the shuttle box. The spring 121 also causes a slight pivotal movement of the hook 110 about the pin 113 as it is advanced by the actuating arm 114 into engagement with lug 111 of the shuttle. The arm 114 is actuated against the tension of spring 120 to advance it and consequently the hook 110 by means of a pin arm 122 which is attached to the end of the pin 115 which projects rearwardly from the bearing bracket 116. Mounted on the pin arm 122 is a cam roller 123 which rides on a cam arm 124 secured at its rear end to the side frame 1 of the loom and projecting forwardly therefrom. It will be clear from a comparison of Figs. 14 to 16 of the drawings that in the rear position of the lay as shown in dotted lines in Fig. 14, the hook 110 and its operating parts will be in the positions illustrated in Fig. 15 of the drawings. As the cam roller 123 rides up on the outer end of the cam arm 124 during the forward movement of the lay, the cam roller 123 and consequently the pin arm 122 will be lifted to pivot the pin 115 in a counter-clockwise direction, as viewed in Figs. 15 and 16, to move the actuating arm 114 in a similar direction and consequently advance the hook 110 to the position illustrated in Fig. 16 into engagement with the lug 111 on the shuttle 30. This operation of the parts occurs during the forward motion of the lay just after the lay has advanced through the half way point of its forward stroke or just after the crank arm 9 has passed the point designated D in Fig. 1 of the drawings, by which time the shuttle which has been thrown from the shuttle box on the opposite side of the loom, will have arrived in the shuttle box associated with such mechanism. If the momentum of the shuttle 30 is insufficient to bring it to proper position in the shuttle box to enable the filler carriage hook 95 to latch with the lug 96 on the carriage 39, the hook 110 during its advancing movement will through its engagement with the lug 111 draw the shuttle 30 home against the end of the picker 70 as is illustrated in Fig. 16. During this drawing operation of the hook 110 the carriage 39 on the shuttle will have been moved to its outermost position, as shown in Fig. 11 by the engagement therewith of the spring-pressed plunger 92 and secured between said plunger and the hook 95, thereby locking it in proper position to receive the means for releasing the end of the filling thread carried thereby across the loom and feeding the end of the new filling thread to be carried by the shuttle across the loom on its next throw. On the return movement of the lay the cam roller 123 rides down the incline at the outer end of the cam arm 124 just before the lay reaches the half way point of its return stroke or before the crank arm 9 reaches the position designated C in Fig. 1 of the drawings, thereby enabling the spring 120 to retract the hook 110 to its normal position with the lower end of the actuating arm 114 in engagement with the cushioned stop 125, as is shown in Fig. 15 and freeing the shuttle for actuation by the picker 70 when the crank arm 9 reaches the position designated C in Fig. 1 of the drawings.

In the event that the momentum of the shuttle is insufficient to bring the shuttle 30 far enough into the shuttle box to enable the hook 110 to engage the lug 111 on the shuttle, means are provided to render the loom at once inoperative in order that damage to the cooperating mechanisms will be prevented. These means comprise a finger 175 associated with each of the shuttle boxes of the loom, each of such fingers 175 extending through a guide bracket 176 mounted on the bottom plate 60 of the shuttle box and into the interior of the shuttle box (see Figs. 1 to 3). Each finger 175 is attached at its forward or outer end to the upper end of an arm 177 which is fixedly connected at its lower end to a rod 178 extending transversely across the front of the loom. The rod 178 is provided with a coiled spring 179 arranged to bias the rod in the direction indicated by the arrow in Fig. 2 of the drawings and to rotate the rod in such direction should the shuttle 30 fail to be positioned in one of the shuttle boxes for a proper functioning of the filling thread discharging and feeding instrumentalities which are to coact with the shuttle carriage 39. The shuttle 30 is provided at each end with a protector shield 88 (see Figs. 5 and 6) which engages with the fingers 175 and prevents wear and damage to the shuttle due to its contacts with such fingers at each end of the rod 178 during the operations of the loom. Also attached to one end of the rod 178 is a lever arm 180 which projects forwardly and is provided on its forward or outer end with a transverse pin on which is carried a cam roller 181. Engaged by the cam roller 181 is a cam member 182 which is fixedly secured to the frame of the machine by means of a bracket 183. The cam member 182 is constructed and arranged so that it terminates at a point which approximates the position of the cam roller 181 relative thereto at the half way point of the forward stroke of the lay, at which position of the latter the mechanisms coacting with the lay for discharging and feeding the filling threads to the carriage and for forming the selvage have not as yet been actuated. Spaced from the lever arm 180 and secured to the rod 178 is a striker arm 184 which extends forwardly and is adapted at its forward end to engage with a notch 185 provided in the rear edge of a transverse lever 186 which is pivotally supported intermediate its ends on a pin 187 attached to the cross beam 188 of the loom underlying the templet 12. The lever 186 at its outer end engages with an operating handle 189 affixed to a shaft 190 which extends across the loom beneath the cross beam 188 and is connected on the left hand side of the loom with suitable electrical or frictional control mechanism (not shown).

In the normal operation of the loom, the engagement of a shuttle in either shuttle box with one of the fingers 175 will hold the rod 178 against rotation under the influence of its associated coiled spring 179 when the cam roller 181 is beyond the undersurface of the cam member 182 during the last half of the forward movement and the first half of the return movement of the lay. The striker arm 184 during such normal operations passes below the transverse lever 186 and does not come into engagement with the same. Should the shuttle however fail to come into either shuttle box sufficiently to be drawn home by the hook 110, nothing will prevent the coiled spring 179 from rotating the rod 178 in a clockwise direction, as viewed in Fig. 1, when the roller 181 moves beyond the forward end of the undersurface of the cam member 182 as the lay moves forwardly on the second half of its forward stroke. The rotational movement of the rod 178 will lift the striker arm 184 sufficiently to bring its forward end into engagement with the notch 185 of the lever 186 to be pivoted about the pin 187, thereby causing the outer end thereof to actuate the handle 189 rearwardly to its throw off position, the position illustrated in Fig. 1 of the drawings. The rotation of the handle 189 and consequently the shaft 190 will cause the control apparatus associated therewith to be placed in a condition to stop the operation of the loom just before the lay comes into position for the operation of the filler thread discharging and feeding means and the selvage forming means.

*Filler thread discharging and feeding means*

The means for releasing the filling thread F carried across the loom by the carriage 39 of the shuttle 30 consists of a releasing plate 128 which is mounted on the forward end of the slidable arm 107, as is shown more clearly in Figs. 19 and 20 of the drawings. As the lay in its forward motion, with the shuttle 30 and carriage 39 thereof correctly positioned as has been hereinabove described, brings the carriage 39 up to the plate 128, the latter will engage the inner latch member of the carriage 39 (at the left-hand side of the loom the member 53 and at the right-hand side of the loom the member 48) and force such member aside against the tension of the spring 55, thereby releasing the fastened end of the filling thread F from the engagement of such member and its associated end member (members 43 and 44, see Figs. 4 and 9 of the drawings).

Immediately following the engagement of the releasing plate 128 with the inner latch member of the carriage 39, the lower projecting end of the eyes 25 provided on the outer end of the needle 26 will come into engagement with the other or outer latch member of the carriage and open such member against the tension of the spring 55. The needle 26 is pivotally mounted at its forward end on an extension 129 of the bracket 108, such pivotal connection being loose to enable a slight side-wise movement of the outer end of the needle 26. The arrangement of the needle 26 is such that the eye 25 of the needle first comes into engagement with the inclined surface of the latch member engaged at a point spaced from the inner edge of its associated end member. As the lay continues its forward movement, the looseness provided at the pivotal point of the needle will enable the eye 25 to be cammed slightly towards the associated end member so that when it has entered between the latch and end members engaged, it will be frictionally engaged by the opposed edges of both members. The needle 26 is normally pressed down against an underlying stop by a spring 130 which is attached at one end to the extension 129 and at its free end engages the top surface of the needle 26 as is shown in Fig. 19 of the drawings. Intermediate the ends of the needle 26 is provided a transverse pin 131 which during the forward motion of the lay comes into engagement with a cam arm 132 mounted on the lay and adapted by such engagement with the pin 131, to lift the needle 26 against the tension of its associated spring 130, thereby lifting the eye 25 of the needle upwardly out of engagement between the engaged latch and end members of the carriage 39. As soon as the eye 25 is moved past such members the latch member under the tension of the spring 55 will immediately snap to closed position, thereby anchoring the end of the filling thread dangling through the eye 25 to the carriage, as is shown in Fig. 21 of the drawings. As a result of the operations of the releasing plate 128 and the needle 26, the end of the thread which has been carried across the loom by the shuttle 30 has been released and the end of a new filling thread from the spool 12 on the adjacent side of the loom will have been connected to the carriage 39 of the shuttle 30, so that when the shuttle is again operated by the picker 70, it will carry across with it the attached end of the new filling thread to the opposite side of the loom.

*Filling thread cutting means*

After a filling thread has been carried across the loom by the shuttle 30, mechanisms come into operation in the second half of the forward stroke of the lay to cut such thread from the spool from which it has been fed. The mechanism for accomplishing this purpose comprises a stationary blade 135 which is fixedly attached to the sliding arm 107 and a movable blade 136 which is pivotally mounted on a spring-pressed bolt 137 extending through the outer end portion of the arm 107 and the stationary blade 135 as is shown more clearly in Figs. 22 to 25 of the drawings. A spring 138 is provided intermediate the arm 107 and the head of the bolt 137 to maintain the movable blade 136 in close engagement with the stationary blade 135. Normally disposed in a slot provided in the upper end portion of the blade 136 extending above the upper edge of the slidable arm 107, is an actuating pin 139 which is provided on the outer end of a bracket 140 secured to a stationary supporting arm 142 in any suitable manner as by means of a bolt 141. The arm 142 is fixedly secured to the bracket plate 108 in any suitable manner, as by means of bolts. A spring 143 connects the outer end of the stationary supporting arm 142 with the inner end of the slidable member 107 and normally maintains such member in its outermost position with the forward end thereof up against the guide member 109, as is illustrated in Figs. 22 and 23 of the drawings, such member 109 functioning as a stop to limit the movement of the slidable arm 107 towards the lay 6. In this position of the parts the blades 135 and 136 are opened. As the lay 6 moves forwardly toward such mechanism a striking plate 145 mounted on the top plate 69 of the shuttle box engages with a rearwardly projecting portion 144 provided on the slidable member 107 and forces such member forwardly against the tension of the spring 143 (see Fig. 24). As the slidable member 107 is forced forwardly, the pin 139 rotates the movable blade 136 in a clockwise direction, as viewed in Figs. 24 and 25, the closing blades thereupon cutting the filling thread connecting the needle 26 with the carrier 39 of the shuttle which is now positioned on the other side of the loom. In the passage of the shuttle 30 across the loom, the thread was drawn over a guide finger 146 projecting forwardly from the lay (see Figs. 22 and 23) and positioned so that it moves intermediate the needle 26 and the cutters 135 and 136 on the forward motion of the lay. The finger 146 in such forward movement of the lay brings the filling thread into proper position with the cutting edge of the lower blade 135 for the cutting operation, as is illustrated in Fig. 22 of the drawings. Furthermore when the lay moves forwardly there is provided thereon a finger 147 which engages the portion of the thread on the other side of the cutting blades, as is shown in Fig. 24 and positions the thread to assure a positive cutting thereof when the blades are forced into closed position. In Fig. 25 of the drawings the lay is shown in its fully advanced position ready to return to its retracted position. As the lay is retracted, the sliding arm 107 will advance rearwardly under the tension of the spring 143 and thereby cause the pin 139 to rotate the movable blade 136 in a counter-clockwise direction and return such blade to its open position. When the sliding member 107 advances to its fully extended position the parts will be again in the position illustrated in Fig. 22 of the drawings. As soon as the filler thread F has been cut means come into operation to form the ends thereof into a selvage.

Selvage forming mechanism

The selvage forming mechanism on each side of the loom comprises a filling hook 150 which is connected by means of a bent pin 151 to the outer end of a curved swivel arm 152. The inner end of the swivel arm 152 is connected to a pin 153 rotatably supported between the arms of a U-shaped bracket member 154. The swinging arm 152 may be adjusted vertically by shifting its position relative to the pin 153 and is secured in position on such pin by means of a set screw. The bracket 154 is mounted on the upper end of a bracket arm 155 attached to the upper surface of the bracket plate 108. The swinging arm 152 is provided intermediate its ends with an upwardly extending pin 156 to which is connected one end of an arm 157, the other end of the arm 157 being pivotally connected to a pin 158 provided on the outer end of the slidable member 107. It will be seen, therefore, that as the slidable arm member 107 is forced forwardly by the striker plate 145, as is illustrated in Figs. 24 and 28, the swinging arm 152 and consequently the filling hook 150 will be rotated about the pin 153, forwardly and upwardly in a counter-clockwise direction, as viewed in Figs. 26 and 28, from the position shown in Fig. 26 to the position shown in Fig. 28, the range of travel of the arm 152 and hook 150 being shown more clearly in Fig. 2 of the drawings, in which figure the full line position of arm 152 and hook 150 corresponds to the position illustrated in Fig. 26 while the dotted line position of such parts corresponds to the position illustrated in Fig. 28 of the drawings. When the lay is returning to its retracted position the swinging arm 152 and consequently the hook 150 will, under the action of the spring 143 on the slidable member 107, move in a clockwise direction from the position shown in Fig. 28 to the position shown in Fig. 26. Due to the fact that the arm 152 moves along a curved path in its movements, the connections at the ends of the arm 157 are universal connections. During the movement of the swinging arm 152 and the hook 150 from their retracted position as shown in Fig. 28 to their advanced position as shown in Fig. 26, the hook 150 passes through the warp threads of the upper shed at the end adjacent to such hook. A better understanding of this movement of the hook 150 may be made by comparing Figs. 31 to 36 of the drawings. Assuming that the movement of the hook 150 is the opposite to that illustrated in such figures, it will be seen that as the hook advances, it moves from the position illustrated in Figs. 35 and 36, through the upper shed between the fourth and fifth and warp threads W as is illustrated in Figs. 33 and 34, to a position where it projects beyond the selvage thread S as is shown in Figs. 31 and 32. At the end of its forward movement, the position illustrated in Fig. 26, the hook 150 projects beyond the end warp thread W and the selvage thread S in a position slightly advanced from that illustrated in Figs. 31 and 32 of the drawings. During this movement of the hook 150 the selvage thread, which is normally in a position adjacent to the warp threads of the upper shed, is depressed to enable the end of the hook 150 to pass over such thread.

The mechanism for depressing the selvage thread S comprises a cam arm 160 (see Figs. 1 to 3) extending transversely above the lay and pivotally attached at its rear end to a supporting bar 161 which is fixedly secured in position on the loom by means of a bracing rod 162 connected at one end to the side frame 1 of the machine and at its other end to the bar 161. The upper end of the bar 161 is connected in any suitable manner to the cross channel beam 163 of the loom. The cam arm 160 rides in a slot provided in a guide member 164 which is mounted on the cross beam 119 of the lay and which moves relative to such arm in the movements of the lay, as is shown more clearly in Figs. 29 and 30 of the drawings. Adjacent to its outer or forward end the cam arm 160 is provided on its under surface with a cam surface 165 which enables the cam arm to be depressed when the guide member 164 is in engagement with such cam surface. Mounted on the cam arm 160 intermediate the guide member 164 and the supporting bar 161, is an adjustable weight 166 which maintains the lower edge of the cam arm in engagement with the bottom of the slot in the guide member 164. The outer end of the cam arm 160 is connected by means of a link 167 to the outer end of an arm 168 which at its inner end is pivoted at the point 169 to the supporting bar 161. As will be clearly seen from Figs. 29 and 30 of the drawings, the arm 168 is provided intermediate its ends with an eye 170 and adjacent its outer end, on a downwardly projecting extension 171 thereof, with an eye 172 through which eyes the selvage thread S extends. It will be seen that as the lay moves forwardly from its rear position, as illustrated in Fig. 29, the cam arm 160 and the arm 168 are in their raised positions so that the selvage thread S is positioned adjacent to the warp threads forming the upper layer of the shed. As the lay moves forwardly into the region of the cam surface 165, the cam arm 160 under the influence of the weight 166 and the arm 168 will be lowered, thereby causing the eye 172 to depress the selvage thread S, as is shown in Fig. 30. On continuation of the forward movement of the lay, the guide member 164 will again raise the arms 160 and 168 thereby raising the selvage thread. On the return movement of the lay, the reverse of these operations will take place. As the hook 150 is moving into position between the threads of the upper layer of warp threads of the shed in the region between the extension 171 of the arm 168 and the woven material, at the time that the guide member 164 is in engagement with the cam surface 165 on the return movement of the lay, the hook 150 is enabled to pass over such depressed portion of the selvage thread. On continued rearward movement of the lay, the selvage thread S will be lifted to bring it into engagement against the under surfaces of the hook 150, as is illustrated in Figs. 31 and 32 of the drawings. On the next forward stroke of the lay, the end of the hook 150 will engage with the portion of the thread extending from the needle to the shuttle which has been thrown across the loom, as is illustrated in Figs. 31 and 32. As the lay continues its forward movement to bring the cutting mechanism into operation, as has been previously explained, the cut thread is drawn by the hook 150 between the upper and lower layers of warp threads in the shed. At this time the lay in its forward motion brings the guide member 164 into the region of the cam surface 165 so that the selvage thread is again lowered, thereby tensioning the selvage thread against the pull exerted on the filler thread by the hook 150, such condition of the parts being illustrated in Figs. 33 and 34 of the drawings. As the lay completes its forward movement, the hook 150 is brought out from beneath the shed of the warp threads, leaving the end of the filling thread on the warp threads of the upper shed, as is illustrated in Figs. 35 and 36 of the drawings. The final position of the selvage end of the filling thread with respect to the selvage thread and the warp threads is illustrated in Fig. 37 of the drawings. When the shed is reversed the several threads will be in the positions shown in Fig. 38 of the drawings, the reed having pushed the filling thread into close engagement with the other threads of the finished product.

*Summary of operation of the loom*

From the above detailed description it is believed that the constructions and operations of the several instrumentalities with which the invention is concerned will be understood. These instrumentalities, as has been previously indicated perform their operations during the last half of the forward movement of the lay 6 or while the crank arm 9 is moving from the position designated D to the position designated A in Fig. 1 of the drawings. When the crank arm 9 is in the position designated A, the lay is in its extreme forward position and the shed is closed. In this position of the lay, the shuttle 30 is locked in position in one of the shuttle boxes by the engagement of the hook 110 with the lug 111 on the top side of the shuttle and the filling thread carriage 39 on the shuttle is locked in position by the spring-pressed plunger 92 and the hook 95. Assuming that the shuttle is in the right-hand shuttle box, on the right-hand side of the loom, the releasing plate 128 on the slidable arm 107 is holding the latch member 48 of the filler carriage retracted against the tension of its associated spring 55 and the rear end of the needle is above the carriage with the end of the filler thread dangling therefrom caught between the latch member 53 and the end member 44 of the carriage, as is illustrated in Fig. 21. The slide arm 107 is being held in its fully retracted position by the striker plate 145 so that the movable blade 136 of the filling thread cutter is fully closed (see Fig. 25) and the selvage hook 150 is in its fully retracted position (see Figs. 2 and 28). On the left-hand side of the loom, the corresponding mechanisms are similarly disposed but the shuttle and filler carriage hooks 110 and 95, respectively, are of course not in engagement with the shuttle. Both the selvage forming ends of the filling thread last carried by the shuttle, however, have been drawn through the outer warp threads so that they are interlocked with the latter and the reed 5 has moved such interlocked thread up against the finished material.

As the crank arm 9 moves from the position A to the position C during the rotating movements of the crank shaft 10, the lay 6 moves rearwardly and the harness 4 opens the shaft. During this period of movement of the lay, the shuttle remains at rest in the shuttle box at the right hand side of the loom. The slide arm 107, however, moves rearwardly with the lay under the influence of spring 143 and during such movement causes the selvage hook 150 to swing rearwardly and downwardly so that it enters between the fourth and fifth warp threads of the upper shed, as has been previously explained. The hook 150 enters between the threads just about the time that the cam surface 165 of arm 160 has been brought into engagement with the guide member 164 so that the selvage thread S is momentarily depressed to enable the selvage hook 150 to pass over it. During this rearward movement of the slide arm 107 the movable blade 136 of the filler thread cutter is returned to its open position by the pin 139 (see Fig. 24). At the end of the rearward movement of the slide arm 107 and while the lay is continuing its rearward movement, the releasing plate 128 on the end of such arm disengages from the latch member 48 of the filler carriage 39 and permits the latter to close under the pressure of its associated spring 55. During this rearward movement of the lay, the camming member 132 is also moved out of engagement with the needle 26 thereby enabling the latter to return to its normal position, leaving the end of the filling thread in the carriage, as will be understood from a comparison of Figs. 19 to 21. In this period also the catch hook 101 rides up on the pin 106 provided on the slide arm 107 to release the hook 95 from the carriage 39 (see Figs. 17 and 18) and the cam roller 123 which controls the movements of the hook 110 (see Figs. 14 to 16) rides down the inclined cam on the end of the cam arm 124 to permit the retraction of such hook, thereby releasing the shuttle 30, from its locked condition. The corresponding mechanisms on the left-hand side of the machine go through similar operations to place such mechanisms in a condition to receive the shuttle on the next pick and to be operated on the next forward movement of the lay.

When the crank arm 9 reaches the position indicated C in Fig. 1 of the drawings the picker 70 is actuated to strike the shuttle 30, the latter being thrown as a result of such impact, across the loom. The period of time in which the shuttle 30 moves from one shuttle box to the other, being the period that the crank arm takes to move from the position designated C through the position designated B to the position designated D, or during the time that the lay has been retracted to its fully opened position and has advanced half way back to its closed position. As the shuttle moves from the shuttle box at the right-hand side of the loom under the impact of the picker 70, the carriage 39 on such shuttle, by reason of its inertia, moves backwardly with relation to the shuttle to the rear end of the latter to a trailing position, the carriage during such rearward motion encountering the friction balls 56 which brake its passage to the rear end of the shuttle. As the shuttle leaves the shuttle box, the filler thread is caught by the guide finger 146 which holds the thread to the lay as the latter continues its rearward motion so that the thread during the passage of the shuttle is held in a position substantially but not quite parallel with the front end of the top surface of the lay. The pendulum member 24 during such passage of the shuttle 30 is swung rearwardly so that there is a gentle forward pull on the filling thread to maintain it in proper position relative to the warp threads of the shed.

When the shuttle comes into the box at the opposite or left-hand side of the loom, the carriage 39 encounters the bumper plunger 92 which if the carriage 39 has not already moved to the rearmost trailing position of the shuttle, forces the carriage there by its obstruction of further movement of the carriage while the shuttle moves home against the pick 70. The lugs 96 on the carriage at such portion of the travel of the shuttle will come into engagement with the inclined forward end of the hook 95 and will pivot the latter out of the way against the tension of the spring 98 bearing against its associated control member 97, such spring as soon as the lug 96 has passed beneath the latching end of the hook 95 returning the hook downwardly so that it comes into engagement with the lug 96 to lock the carriage 39 against the bumper plunger 92. The carriage 39 is thereby locked in position in proper registry for engagement with the releasing plate 128 and the needle 26 on the left hand side of the loom. If the force imparted to the shuttle is not sufficient to bring it within the shuttle box a sufficient distance to enable the shuttle locking hook 110 to engage with the lug 111 on the shuttle and force it home, the automatic safety mechanism associated with the finger 175 then comes into operation to render the loom inoperative, as has been previously explained. Should the shuttle, however, come sufficiently into position in the drawshuttle box to be properly engaged by the drawing or shuttle locking hook 110, the latter will be actuated, as the crank arm 9 travels through the region of its travel indicated by the letter D to engage the lug 111 on the top surface of the shuttle and bring it to proper engagement with the inner end of the picker 70 if it has not already reached there under its own momentum and to lock the shuttle in such position.

As the crank arm 9 moves from the position D to the position A, the releasing plate 128 on the slidable arm 107 at the left-hand side of the loom comes into engagement with the latch member 53 on the filler thread carriage 39 to release the end of the thread carried across the loom thereby. The released end of the thread drops across the selvage hook 150 which is now positioned below such carriage, in position to enable the hooked end of the hook 150 to catch and to pull such loose end through the end warp threads at the left-hand side to the shed to form the selvage. The striker plates 145 then engage with the projecting portions 144 of the slidable arms 107 to move the latter forwardly and thereby to rotate the movable blades 136 of the cutters to their closed position. As the thread in this position of the parts is connected to the right-hand needle 26, the cutter 136 at the right-hand side of the loom only will perform an actual cutting operation. At the same time the finger 147 at the right-hand side of the loom engages the thread to tension the portion of the filler thread between the blades of the cutter and enable the latter to perform their function properly. As the slides 107 are moved forwardly, the selvage hooks 150 are also moved from their lowermost positions into engagement with the ends of the filler thread, as shown in Figs. 31 and 32, to bring the latter up through the warp threads of the upper shed, as has been previously explained. Just immediately following the cutting of the thread, as the lay continues its forward movement, the needle 26 on the left hand side of the loom engages with the latch member 48 of the carriage 39 to force the same aside and feed the end of the filler thread from the left-hand cone 14 to the carriage 39. As the lay further continues its forward movement to the closed position, the cam member 132 engages with the pin 131 on the needle 26 and lifts the latter upwardly about its pivot to bring the eye 25 carried by such needle out of engagement between the movable plate 48 and the adjacent end member 43 of the carriage 39, whereupon the plate 48 moves under the pressure of its associated spring 55 and clamps such thread in position. As the loom completes its movement the reed 5 packs the filling thread against the body of the woven fabric. The parts are then again in position to begin their cycle of movements as the lay moves rearwardly on its next backward stroke.

Having thus illustrated and described a loom embodying the invention, it will be obvious to those skilled in the art that changes in the form, construction and arrangement of the several cooperating mechanisms may be resorted to without departing from the spirit and scope of the invention and hence we do not wish to limit ourselves strictly to the structures herein set forth.

We claim:

1. In a loom, a shuttle comprising a body portion having a guideway extending longitudinally thereof, the guideway being approximately as long as the body portion of the shuttle and forming an elongated recess along one side of such body, a guide member slidably mounted in said guideway and having a range of movement greater than one-half the length of said guideway, a filling thread carriage carried by said guide member and projecting from the said recessed side of the shuttle, and a picker for imparting a blow to said shuttle and through such blow to move said carriage from one end of the body of said shuttle to the other end of the latter.

2. In a loom, a shuttle comprising a body portion having a guideway extending longitudinally thereof, the guideway being approximately as long as the body portion of the shuttle and forming an elongated recess along one side of such body, a guide member slidably mounted in said guideway and having a range of movement greater than one-half the length of said guideway, a filling thread carriage carried by said guide member and projecting from the said recessed side of the shuttle, means provided on said body portion for braking the longitudinal movement of said carriage, and a picker adapted to impart a blow to said shuttle and through such blow to cause movement of said carriage relative to said body of the shuttle.

3. In a loom, a shuttle comprising a body portion having a guideway extending longitudinally thereof, the guideway being approximately as long as the body portion of the shuttle and forming an elongated recess along one side of such body portion, a guide member slidably mounted in said guideway and having a range of movement greater than one-half the length of said guideway, a filling thread carriage carried by said guide member and projecting from the said recessed side of the shuttle, means associated with said guideway for yieldably retarding the movement of said carriage relative thereto and picker means for imparting a blow to said shuttle sufficient to cause said carriage to slidably move in said guideway from one end of the body of the shuttle to the other end thereof.

4. In a loom, a shuttle comprising a body portion having a guideway extending longitudinally thereof, a guide member slidably mounted in said guideway, a filling thread carriage carried by said guide member, means associated with said guideway adapted to brake the movements of said carriage and guide member, said carriage including a pair of thread-clamping members, means for normally maintaining said members in clamping position, picker means for imparting a blow to said shuttle sufficient to cause movement of said carriage and guide member relative to said guideway and means adapted to release said clamping members from their clamped position.

5. In a loom, a shuttle comprising a body portion having a guideway extending longitudinally thereof, a guide member slidably mounted in said guideway, a plurality of spaced spring pressed balls projecting through apertures in a wall of said guideway so as to be successively engaged by said guide member during its sliding movements and adapted to brake the movements of said member, a filling thread carriage connected to said guide member, a shuttle box, and means associated with said shuttle box to impart to said shuttle a blow sufficient to cause movement of said carriage from a predetermined position on one end of the shuttle towards the other end thereof.

6. In a loom, a shuttle having a body portion, a filling thread carriage slidably supported on said body portion and movable longitudinally thereof, a shuttle box, means associated with said shuttle box for locking said carriage in a predetermined position relative to said shuttle and means for releasing said locking means prior to the throw of said shuttle.

7. In a loom, a shuttle having a body portion, a filling thread carriage slidably connected to said body portion and movable longitudinally thereof, a latching lug on said carriage, a shuttle box, yieldable stop means carried by said shuttle box and arranged to engage said carriage, a latch member carried by said shuttle box and adapted to engage said latching lug to lock said carriage against said stop and in a predetermined position relative to said body portion of the shuttle.

8. In a loom, a shuttle comprising a body portion, a carriage having a latching lug and being slidably connected to said body portion for movement longitudinally thereof, a shuttle box, a spring pressed plunger mounted on said shuttle box and arranged to engage said carriage, a latch member pivotally mounted on said shuttle box and adapted to engage with said carriage lug as the shuttle moves into said shuttle box and means normally maintaining said latch member in the path of movement of said lug and adapted to yieldably press such latch member into locking engagement with said lug after the lug has passed beneath said latch member.

9. In a loom, a shuttle comprising a body portion, a filling thread carriage slidably mounted on said body portion for movement longitudinally thereof, a lug carried by said carriage, a shuttle box, means associated with said shuttle box to lock said carriage in a predetermined position relative to the body of said shuttle and means for automatically releasing said locking means at a predetermined portion of the movement of said loom.

10. In a loom, a shuttle comprising a body portion, a filling thread carriage slidably supported on said body portion and movable longitudinally thereof, a shuttle box, means associated with said shuttle box for locking said carriage in a predetermined position relative to said body portion of the shuttle, a control member associated with said locking means and adapted to control the operation of the same, and means provided on a fixed portion of said loom and adapted to engage said control member to actuate the latter during the movements of the loom.

11. In a loom, a shuttle comprising a body portion, a filling thread carriage slidably supported on said body portion for movement longitudinally thereof, a shuttle box, means associated with said shuttle box for locking said carriage in a predetermined position relative to the body portion of the shuttle, said means comprising a latch member engageable with a lug on said carriage, a cam arm associated with said latch member, a catch hook provided on the outer end of said cam arm and an actuating member associated with a fixed portion of said loom and adapted to be engaged by said catch hook to cause the release of said locking means from its locked position.

12. In a loom, a shuttle comprising a body portion, a filling thread carriage slidably connected to said body portion and movable longitudinally thereof, a shuttle box, a casing carried by said shuttle box, a spring pressed plunger positioned on said casing and extending outwardly into the path of movement of said carriage, a latching hook pivotally mounted on said shuttle box and adapted to engage with a lug on said carriage, a spring for normally maintaining said latching hook in its lowermost position, a pivoted arm associated with said latching hook and means engageable with the outer end of said arm for pivoting the latter to lift said latching hook out of engagement with the lug on said carriage and thereby to free said carriage for movement with said shuttle.

13. In a loom, a shuttle comprising a body portion, a lug mounted on the top surface of said body portion, a shuttle box, a picker associated with said shuttle box, a draw hook associated with said shuttle box and adapted to engage with said lug on the shuttle, an actuating arm pivotally connected to said draw hook, means for normally maintaining said actuating arm and draw hook in their retracted positions and cam means for operating said actuating arm to advance said draw hook into engagement with the lug on said shuttle and from such engagement to draw said shuttle up against the end of said picker.

14. In a loom, a shuttle box, a picker associated with said shuttle box and provided on its forward end with a recess containing cushioning discs and at its other end with an elongated slot, a picker stick extending through said slot, a shuttle provided on its upper surface with a lug, a draw hook slidably mounted on said shuttle box and adapted to engage said lug, an actuating arm pivotally connected to said draw hook, spring means normally maintaining said actuating arm in retracted position, a cam roller connected to said actuating arm, a cam associated with said cam roller and adapted to advance the actuating arm to enable said draw hook to engage with the lug on said shuttle and force the latter up against the cushioned end of said picker, said cam arm being formed to cause the retraction of said actuating arm and said draw hook prior to the actuation of said picker by said picker stick.

15. In a loom, a shuttle box, a picker associated with said shuttle box, a draw hook extending through said shuttle box and adapted to engage with a portion of a shuttle positioned in said box, an actuating arm pivotally connected to said draw hook, means for normally maintaining said hook and actuating arm in their retracted positions, cam means operable during the movements of the loom to advance said actuating arm and draw hook, and means for guiding said draw hook into engagement with the shuttle positioned in said shuttle box, said cam means being formed to enable said draw hook to lock the shuttle against said picker during a predetermined portion of the movements of the loom.

16. In a loom, a shuttle comprising a body portion, a filling thread carriage slidably mounted on said body portion for movement longitudinally thereof, a shuttle box, means for locking said shuttle in a predetermined position in said shuttle box, means associated with said shuttle box for locking said carriage in a predetermined position relative to the body of said shuttle and means for releasing the locking engagement of said shuttle locking means and filling thread carriage locking means.

17. In a loom, a shuttle comprising a body portion having a filling thread carriage slidably connected thereto for movement longitudinally thereof, a shuttle box, means associated with said shuttle box for locking said filling thread carriage in a predetermined position with relation to the body of said shuttle, a pair of clamping members carried by said carriage and means associated with a fixed portion of said loom and adapted to interengage with said clamping members to feed a filling thread to one of said members and to release a filling thread from the other of said members during the cycle of movement of the loom.

18. In a loom, a shuttle comprising a body portion, a filling thread carriage slidably connected to said body portion for movement longitudinally thereof, a pair of spring pressed clamping members carried by said carriage, a shuttle box, a member fixed in spaced relation to said shuttle box, a needle pivotally mounted on said fixed member, a releasing plate carried by said fixed member, and means associated with said shuttle box for positioning said carriage to enable said needle and releasing plate to engage with said clamping members in the forward movement of the lay to feed a filling thread to one of said members and to release a filling thread from the other of said members.

19. In a loom, a shuttle comprising a body portion, a filling thread carriage slidably connected to said body portion for movement longitudinally thereof, a clamping device carried by said carriage, a shuttle box, means associated with said shuttle box for locking said carriage in a predetermined position with relation to the body of said shuttle when the latter is properly positioned in said shuttle box, a member spaced from said shuttle box, a needle pivotally mounted on said member and extending toward said shuttle box, the outer end of said needle being adapted to interengage with the clamping device on said carriage to open the latter and a cam associated with said shuttle box for moving said needle upwardly about its pivot to free the end thereof from said clamping device and thereby leaving the end of a thread carried thereby caught in said clamping device.

20. In a loom, a shuttle comprising a body portion, a filling thread carriage slidably mounted on said body portion for movement longitudinally thereof, a shuttle box, means associated with said shuttle box for locking said carriage in a predetermined position on said shuttle, means for feeding a filling thread to said carriage while the shuttle is at rest in said shuttle box, a picker associated with said shuttle box for imparting a blow to said shuttle of sufficient intensity to cause said carriage to move to a trailing position on the body of said shuttle and means for exerting a rearward tension on said thread as the shuttle is travelling across the loom.

21. In a loom, a shuttle comprising a body portion, a filling thread carriage slidably connected to said body portion for movement longitudinally thereof, a spring pressed clamping member carried by said carriage, a shuttle box, a member fixed in spaced relation to said shuttle box, a needle pivotally mounted on said fixed member, a filling thread guide member detachably connected to the free end of said needle, means associated with said shuttle box for positioning said carriage to enable said guide member of the needle to engage with said clamping member in the closing movement of the loom to retract said clamping member, and means associated with said shuttle box adapted to pivot said needle to disengage said guide member from said clamping member and to enable the latter to advance and clamp the end of the filling thread extending through said guide member.

ADONE R. PEDRAZZO.
EMIL R. PEDRAZZO.